United States Patent [19]

White et al.

[11] Patent Number: 5,320,399
[45] Date of Patent: Jun. 14, 1994

[54] VEHICULAR SUN VISOR PIVOT ROD

[76] Inventors: Jay E. White, 217 Coral Cay Ter., Palm Beach Gardens, Fla. 44318; Jay R. White, 71 Walnut Centre #303, Rochester, Mich. 48307

[21] Appl. No.: 982,073

[22] Filed: Nov. 24, 1992

[51] Int. Cl.⁵ ............................................. B60J 3/02
[52] U.S. Cl. .................. 296/97.12; 296/97.5; 362/83.1; 200/61.7
[58] Field of Search .............. 296/97.5, 97.9, 97.12, 296/97.13; 362/83.1, 144; 200/52 R, 61.62, 61.7; 174/68.3, 99 R, 135, 136; 248/278

[56] References Cited

U.S. PATENT DOCUMENTS

| 951,505 | 3/1910 | Mather | 174/136 |
|---|---|---|---|
| 4,075,468 | 2/1978 | Marcus | 362/144 |
| 4,174,864 | 11/1979 | Viertel et al. | 296/97.5 |
| 4,390,202 | 6/1983 | Flowerday et al. | 296/97.13 |
| 4,648,011 | 3/1987 | Boote et al. | 362/135 |
| 4,760,503 | 7/1988 | VandenBerge et al. | 362/137 |
| 4,791,537 | 12/1988 | Fisher et al. | 362/135 |
| 4,847,737 | 7/1989 | YanOrder et al. | 362/137 |
| 4,858,983 | 8/1989 | White et al. | 296/97.13 |
| 4,879,637 | 11/1989 | Clark et al. | 362/141 |
| 4,953,064 | 8/1990 | Yiertel et al. | 362/74 |
| 5,054,839 | 10/1991 | White et al. | 295/97.1 |
| 5,143,678 | 9/1992 | Prillard | 362/144 X |

FOREIGN PATENT DOCUMENTS 2737215  4/1978  Fed. Rep. of Germany ..... 296/97.1

Primary Examiner—David M. Mitchell
Assistant Examiner—Andrew C. Pike
Attorney, Agent, or Firm—Gifford, Groh, Sprinkle, Patmore and Anderson

[57] ABSTRACT

A pivot rod for a sun visor having a lighted vanity mirror which is constructed with two L-shaped semicylindrical members so that both wires for the circuit can be inserted into a channel prior to assembly. A connector is applied to the wires extending from the mounting socket end of the pivot rod, and the wires extending from the longer leg of the L-shaped pivot rod which is inserted into the sun visor are connected to the lighting circuit in the sun visor.

4 Claims, 1 Drawing Sheet

VEHICULAR SUN VISOR PIVOT ROD

BACKGROUND OF THE INVENTION

1. Field of the Invention

This invention relates to vehicular sun visors, and, more particularly, this invention relates to a pivot rod for use with a sun visor having a lighted vanity mirror.

2. Description of the Prior Art

Pivot rods for vehicle sun visors are used to mount the visor to the vehicle roof through a mounting bracket. Typically, as shown in our U.S. Pat. No. 4,858,983, the pivot rod is L-shaped. The shorter leg of the L-shaped pivot rod is received in the mounting bracket for rotation of the rod to swing the sun visor from a windshield position to a side window position. The longer leg of the L-shaped rod carries the visor for pivotal motion between a storage position adjacent to the vehicle roof to a use position shading the sunlight from the occupants, to a position in which the visor is parallel to the windshield.

When the sun visor has a lighted vanity mirror, it is necessary to make and electrical connection between the vehicle battery and the lights mounted in the sun visor. Typically, a single lead has been brought through the mounting bracket and pivot rod or through a counter bearing at the end of the visor opposite to the pivot rod, and the ground connection is supplied through the vehicle frame. Where a single lead has been brought through the mounting bracket it is normally routed out of the elbow member of the pivot rod directly to the lighting circuit. In other cases where the lead passes through the horizontal axle portion of the pivot rod, the axle portion and pivot elbow are two separate pieces to permit such an assembly.

U.S. Pat. No. 4,174,864 brings the hot lead through a counter bearing to avoid the extremely expensive machining operation to bring the lead through the pivot shaft and the high assembly costs. The ground is through the metal pivot shaft and a metal reinforcing frame work in the visor. An alternative is also shown bringing both leads through the counter bearing. With either construction, the user must position the visor and effect snapping the counter bearing into a mounting clip to receive power for the lights.

In our U.S. Pat. No. 5,054,839 we show a unique pivot rod constructed by injection insert molding a metal tube at the center of a plastic pivot rod. The metal tube forms one of the input leads to the lighting circuit, and a wire inside the tube forms the other input power lead to the lighting circuit.

With the ever increasing sophistication of electronic equipment in vehicles, a need has emerged for supplying both leads to the visor without resorting to the frame ground of the vehicle.

SUMMARY OF THE INVENTION

The present invention provides a novel L-shaped molded plastic pivot rod with two conductors passing through the entire L-shaped rod. Two generally semi-cylindrical L-shaped member are joined together to form a generally cylindrical L-shaped pivot rod. The pivot rod has a channel passing through it so that it accommodates a pair of wires. By providing two semi-cylindrical members, the pair of wires can be inserted in the channel before the members are joined.

In a preferred embodiment, one of the wires is discontinuous having adjacent electrical terminals which extend through the wall of a longer leg of the L-shaped pivot rod. With this construction, when the sun visor is swung from a storage position to a use position, a wiper blade contact in the sun visor will complete the circuit between the two terminals.

Preferably the L-shaped members have a semi-cylindrical external surface and a semi-cylindrical interior surface. Each member has a planar joining surface containing cooperating detents. The L-shaped members are joined by placing the planar joining surfaces in abutment with each other so that the detent means coact forming the pivot rod with a generally cylindrical exterior surface and an internal channel formed by the cylindrical interior surfaces which contains the two wires. Preferably the two planar surfaces are bonded together as by sonic welding.

DRAWING

The advantages of the present invention will be more apparent from the following detailed description when considered in connection with the accompanying drawing wherein.

DETAILED DESCRIPTION OF THE PRESENTLY PREFERRED EMBODIMENTS OF THE INVENTION

Figure 1:
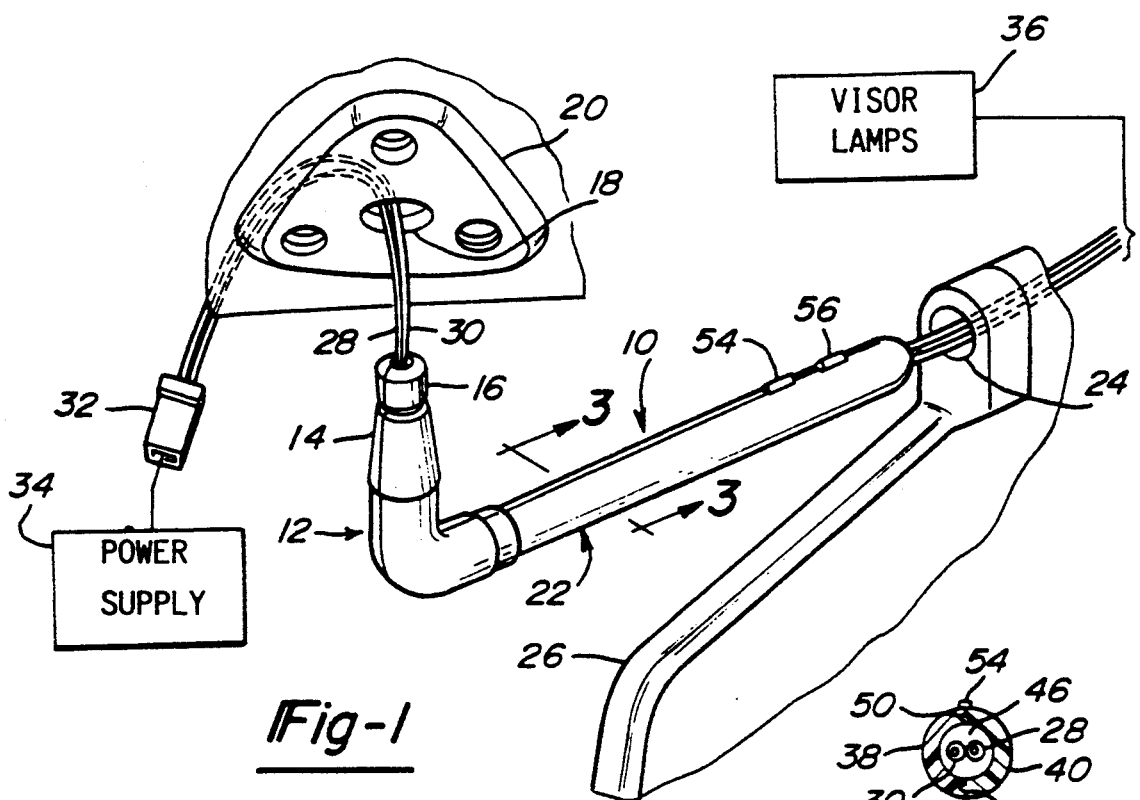
FIG. 1 is an exploded perspective view of the pivot rod of this invention as it is assembled to a standard mounting bracket on a vehicle roof and installed in a vehicle sun visor.
Figure 3:
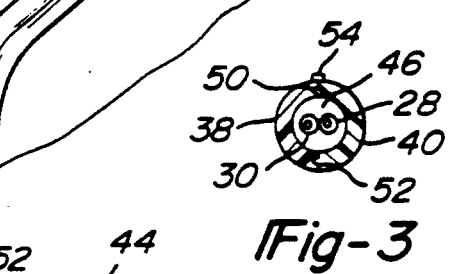
FIG. 3 is a cross sectional view taken along line 3—3 of FIG. 1.

Referring to FIG. 1, the L-shaped pivot rod 10 of the present invention is shown with its shorter leg 12 having a tapered mounting end 14 and lock flange 16 for insertion into socket 18 of mounting bracket 20 attached to the ceiling of the vehicle. Longer leg 22 of L-shaped pivot rod 10 is inserted into socket 24 of sun visor 26. Details of such an assembly are shown in our U.S. Pat. No. 4,858,983.

Insulated conductors 28 and 30 pass through the pivot rod 10 and are assembled at one end to connector 32 for connection to power supply 34. Wires 28 and 30 are connected at their other end to the visor lamp circuitry 36 as shown schematically.

Figure 2:
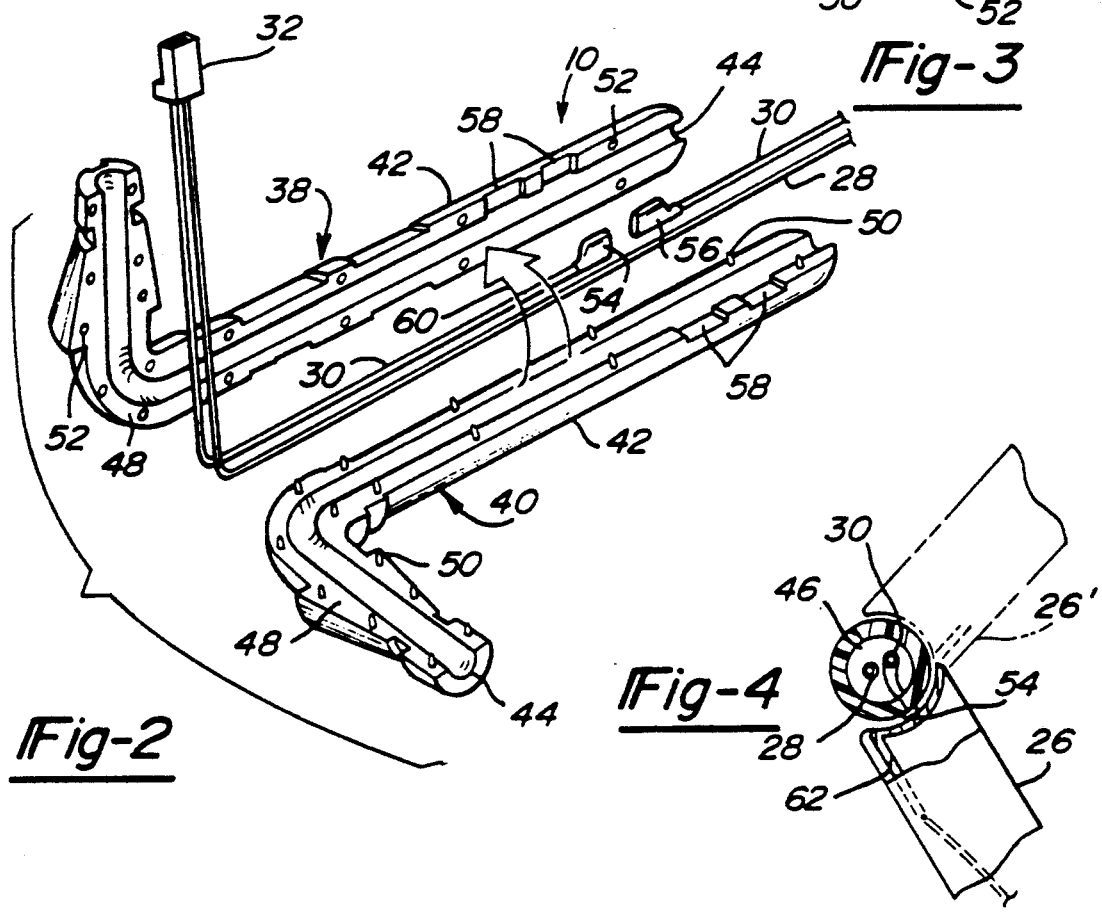
FIG. 2 is an exploded perspective view of the pivot rod itself showing its parts and manner of assembly.

As best seen in FIG. 2 the pivot rod is constructed with two generally semi-cylindrical L-shaped members 38 and 40 having generally cylindrical external surfaces 42 and generally semi-cylindrical inner surfaces 44 forming a channel 46 for wires 28 and 30. Each of the members has a planar joining surfaces 48 with member 40 having projecting detents 50 which are received in socket detents 52 on member 38.

Insulated wires 28 and 30 are bent to conform with the elbow portion of L-shaped members 38 and 40 to align with their internal surfaces 44. One of the conductors 30 is cut, stripped and provided with adjacent terminals 54 and 56. Members 38 and 40 are provided with recesses 58 to accommodate these terminals as the members 38 and 40 are moved in the direction of arrow 60 to engage each other as the planar joining surfaces 48 are moved into abutment with each other with projecting detents 50 engaging the socket detents 52. Terminals 54 and 56 protrude from the assembled L-shaped pivot rod 10 as best seen in FIG. 1.

In addition to the locking action of cooperating detents 50 and 52, L-shaped members 38 and 40 are preferably bonded together. This can be accomplished by applying an adhesive or a solvent to the planar joining surfaces 48 before snapping the two members together. The members are preferably injection molded plastic parts so that bonding is preferably accomplished by sonic welding.

Figure 4:
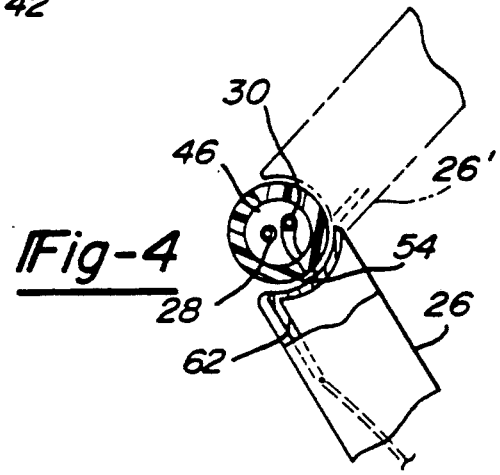
FIG. 4 is a cross sectional view taken through one of the contacts in the longer leg of the pivot rod with the pivot rod assembled to the sun visor and illustrating contact being made in a use position and contact being broken in a storage position shown in phantom.

As best seen in FIG. 4, when the sun visor is in its use position terminals 54 and 56 make contact with wiping contact 62 completing the circuit through wire 30. When the sun visor is moved to its storage position, as depicted in phantom at 26', this contact with wiper 62 is broken so as to open the lighting circuit 36.

We claim:

1. An electrical current carrying L-shaped pivot rod for a vehicular sun visor having a lighted vanity mirror, comprising:
   two generally semi-cylindrical L-shaped members joined together to form said L-shaped pivot rod;
   said L-shaped pivot rod being generally cylindrical and having a channel passing therethrough; and
   a pair of wires passing through said channel wherein one of said wires is discontinuous, having adjacent electrical terminals extending through a longer leg of said L-shaped pivot rod; and
   wherein as said sun visor is swung from storage position to a use position, a contact within said sun visor completes a circuit between said terminals.

2. An electrical current carrying L-shaped pivot rod for a vehicular sun visor having a lighted vanity mirror, comprising:
   two L-shaped members each having:
   a semi-cylindrical exterior surface;
   a semi-cylindrical interior surface;
   a planar joining surface;
   cooperating detente means on said planar joining surfaces;
   said L-shaped members being joined by abutment of said planar joining surfaces and coaction of said cooperating detente means, forming said pivot rod with a general cylindrical exterior surface and a cylindrical channel formed by said semi-cylindrical interior surfaces; and
   a pair of wires passing through said channel;
   wherein one of said wires is discontinuous having adjacent electrical terminals extending through a longer leg of said L-shaped pivot rod; and
   wherein as said sun visor is swung from a storage position to a use position a contact within said sun visor completes a circuit between said terminals.

3. The pivot rod according to claim 2 wherein said planar joining surfaces are bonded together.

4. The pivot rod according to claim 2 wherein said L-shaped members are joined together by sonic welding.

* * * * *